(12) United States Patent
Enderle

(10) Patent No.: US 6,270,127 B1
(45) Date of Patent: Aug. 7, 2001

(54) TWO-STEP, LOW TORQUE WEDGE THREAD FOR TUBULAR CONNECTOR

(75) Inventor: Doug Enderle, Humble, TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 09/615,487

(22) Filed: Jul. 13, 2000

Related U.S. Application Data

(63) Continuation of application No. 09/044,707, filed on Mar. 19, 1998, now Pat. No. 6,174,001.

(51) Int. Cl.⁷ ................................................. F16L 15/00
(52) U.S. Cl. ................................................. 285/334; 285/390
(58) Field of Search .............................. 285/333, 334, 285/355, 390

(56) References Cited

U.S. PATENT DOCUMENTS

| | | | |
|---|---|---|---|
| Re. 34,467 | * 12/1993 | Reeves | 285/334 |
| 4,244,607 | * 1/1981 | Blose | 285/334 |
| 4,662,659 | * 5/1987 | Blose et al. | 285/355 |
| 4,671,544 | * 6/1987 | Ortloff | 285/334 |
| 4,703,954 | * 11/1987 | Ortloff et al. | 285/334 |
| 4,753,460 | * 6/1988 | Tung | 285/355 |
| 4,822,081 | * 4/1989 | Blose | 285/355 |
| 5,154,452 | * 10/1992 | Johnson | 285/355 |
| 6,123,368 | * 9/2000 | Enderle | 285/334 |
| 6,158,785 | * 12/2000 | Beaulier et al. | 285/334 |
| 6,174,001 | * 1/2001 | Enderle | 285/334 |

* cited by examiner

Primary Examiner—Eric K. Nicholson
(74) Attorney, Agent, or Firm—Rosenthal & Osha LLP

(57) ABSTRACT

A threaded pipe connection is disclosed that includes a box member and a pin member. The box member has two wedge thread steps each with a tapered, internal, generally dovetail-shaped wedge thread having stab flanks, load flanks, roots, and crests. The pin member has two wedge thread steps each with a tapered, external, generally dovetail-shaped wedge thread having stab flanks, load flanks, roots, and crests. The internal thread of the box member increases in width in one direction. The external thread of the pin member increases in width in the other direction so that complementary flanks of the box member thread move into engagement during rotational make-up of the connection. The roots and crests of at least one wedge thread step on the box member are dimensioned to contact complementary roots and crests on the pin member upon final make-up. Also, stab and load flanks of at least one wedge thread step on the box member are dimensioned to contact complementary stab and load flanks on the pin member upon final make-up.

16 Claims, 4 Drawing Sheets

TWO-STEP, LOW TORQUE WEDGE THREAD FOR TUBULAR CONNECTOR

CROSS-REFERENCE TO RELATED APPLICATIONS

This application is a continuation of U.S. patent application Ser. No. 09/044,707, filed Mar. 19, 1998 now U.S. Pat. No. 6,174,001.

FIELD OF THE INVENTION

The invention relates to threaded tubular joints usable in oil and gas well drilling and production, such as tubing, casing, line pipe, and drill pipe, commonly known collectively as oilfield tubular goods. More particularly, the invention relates to a tubular joint for connecting male (pin) and female (box) members without having to apply tremendous torque for make-up.

BACKGROUND OF THE INVENTION

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

In U.S. Pat. No. RE 30,647 by Blose, a particular thread form or structure is disclosed for a tubular connection that provides an unusually strong joint while controlling the stress and strain in connected pin and box members within acceptable levels. The pin member is equipped with at least one generally dovetail-shaped external thread whose width increases in one direction along the pin, while the box member is equipped with at least one matching generally dovetail-shaped internal thread whose width increases in the other direction. In this manner, the mating set of helical threads provide a wedge-like engagement of opposing pin and box flanks that limit the extent of relative rotation between the pin and box members, and define a forcible make-up condition that completes the connection. In this thread structure, the flank shoulder angles as well as the thread width can be used to control the stress and strain preload conditions induced in the pin and box members for a given make-up torque. Thus, by tailoring the thread structure to a particular application or use, the tubular connection or joint is limited only by the properties of the materials selected.

The wedge thread has been proven to be a reliable sealing mechanism in threaded connections. The dovetail, wedging action of the threads create sufficient interference in roots, crests, load flanks, and stab flanks to effect the thread seal. The friction drag caused by the interference threads must be overcome with torque during the make-up process. The larger the area of thread interference, the greater the torque requirements are for make-up. As connection diameters increase, e.g., for diameters of 10" or greater, the thread interference area increases until the point is reached where the make-up torque required is not practical for field operations.

As shown in FIG. 1, a prior art connection 10 includes a pin member 11 and a box member 12. Box member 12 has a tapered, internal, generally dovetail-shaped thread structure 14 formed thereon and adapted for engaging complementary tapered, external, generally dovetail-shaped thread structure 15 formed on pin member 11 to mechanically secure the box and pin members in a releasable manner.

Internal thread 14 of box member 12 has stab flanks 18, load flanks 16, roots 20, and crests 24. The thread increases in width progressively at a uniform rate in one direction substantially the entire helical length of thread 14. External thread 15 of pin member 11 has stab flanks 19, load flanks 17, roots 21, and crests 25. The thread increases in width progressively at a uniform rate in the other direction substantially the entire helical length of thread 15. The oppositely increasing thread widths and the taper of threads 14 and 15, cause the complementary flanks, roots, and crests of the respective threads to move into forcible engagement during rotational make-up of the connection and form sealing surfaces that resist the flow of fluids between the threads upon rotational make-up of the connection.

The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

SUMMARY OF THE INVENTION

A threaded pipe connection is disclosed that includes a box member and a pin member. The box and pin members are formed in a two-step configuration having a larger step and a smaller step. The box member has a tapered, internal, generally dovetail-shaped thread across both thread steps with stab flanks, load flanks, roots, and crests. The pin member also has a tapered, external, generally dovetail-shaped thread across both thread steps with stab flanks, load flanks, roots, and crests. The internal thread of the box member increases in width in one direction while the external thread increases in width in the other direction so that the complementary flanks of the respective threads move into engagement during rotational make-up of the connection and form sealing surfaces that resist the flow of fluids between the threads on at least one step of the box and pin members upon rotational make-up of the connection.

In accordance with one or more embodiments of the invention, a gap may exist between the complementary stab flanks of one of the thread steps of the box and pin members upon final make-up. A gap may exist between the complementary load flanks of one of the thread steps of the box and pin members upon final make-up. A gap may exist in the stab flank and the load flank of one of the thread steps upon final make-up. A gap may exist between the complementary roots and crests of the box and pin members of one of the thread steps upon final make-up. A gap may exist in one or more of the complementary load flanks, stab flanks and roots and crests of the box and pin members upon final make-up. The roots and crests of both thread steps may come into contact during make up prior to contact of both stab and load flanks of at least one thread step upon final makeup. One of the wedge thread steps may be an interference wedge thread step and the other may be a clearance wedge thread step. A greater amount of root and crest interference may occur on the interference wedge thread step than on the clearance wedge thread step upon final make-up. Root and crest interference may exist on the interference wedge thread step and root and crest clearance may exist on the clearance wedge thread step upon final make-up.

Advantages may include one or more of the following. By minimizing thread interference area without sacrificing sealing or structural integrity of the connector, it becomes practical for large diameter connectors to be installed at much lower make up torque. Also, by incorporating a two-step structure, high resistance to compression and/or impact loading can be achieved, while sensitivity to the torque. restrictions of existing field make up equipment is retained. Further, the two-step configuration of the invention will reduce the amount of torque required to generate the contact stress necessary for creating a seal, while still providing the necessary threads for structural purposes. Other advantages and features will become apparent from the following description including the drawings and claims.

DETAILED DESCRIPTION

Figure 1:
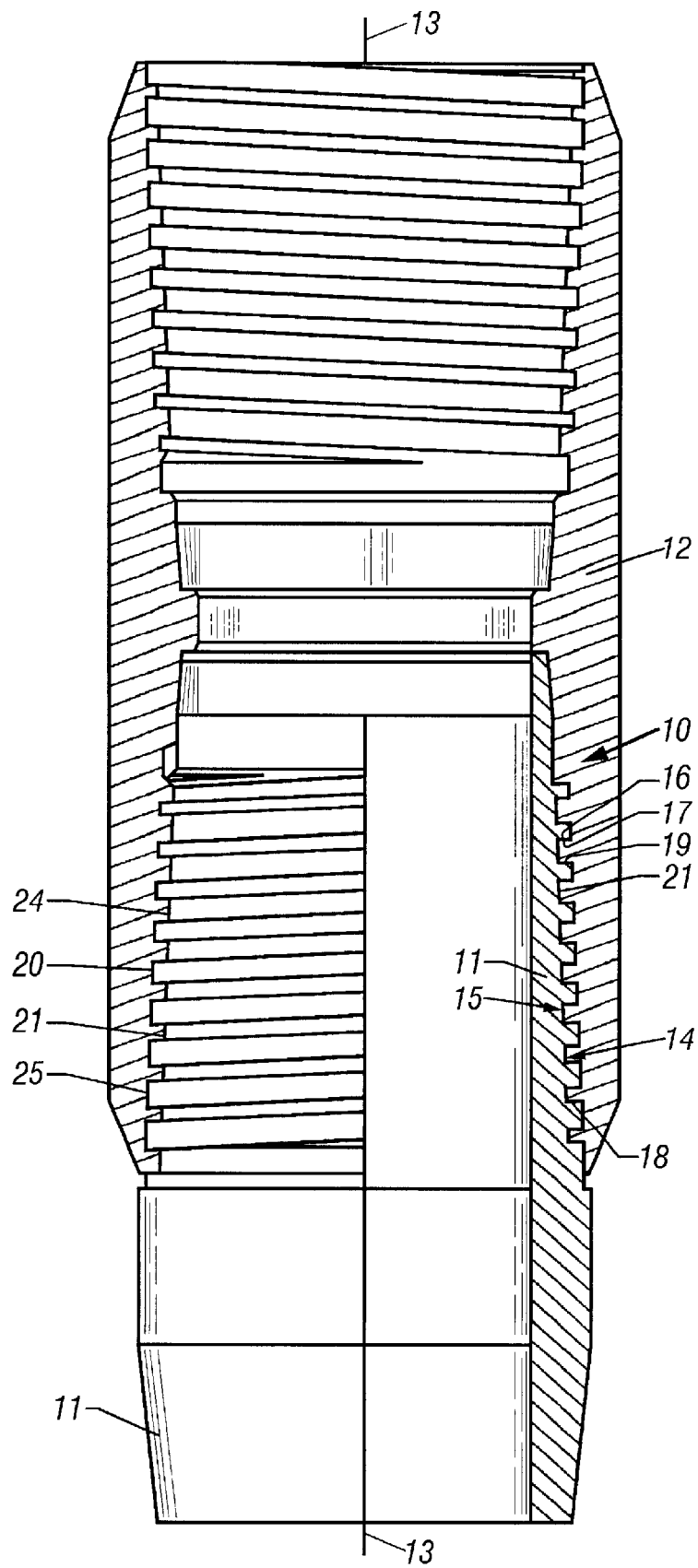
FIG. 1 is a side view, partially in section, of a prior art tubular joint.
Figure 2:
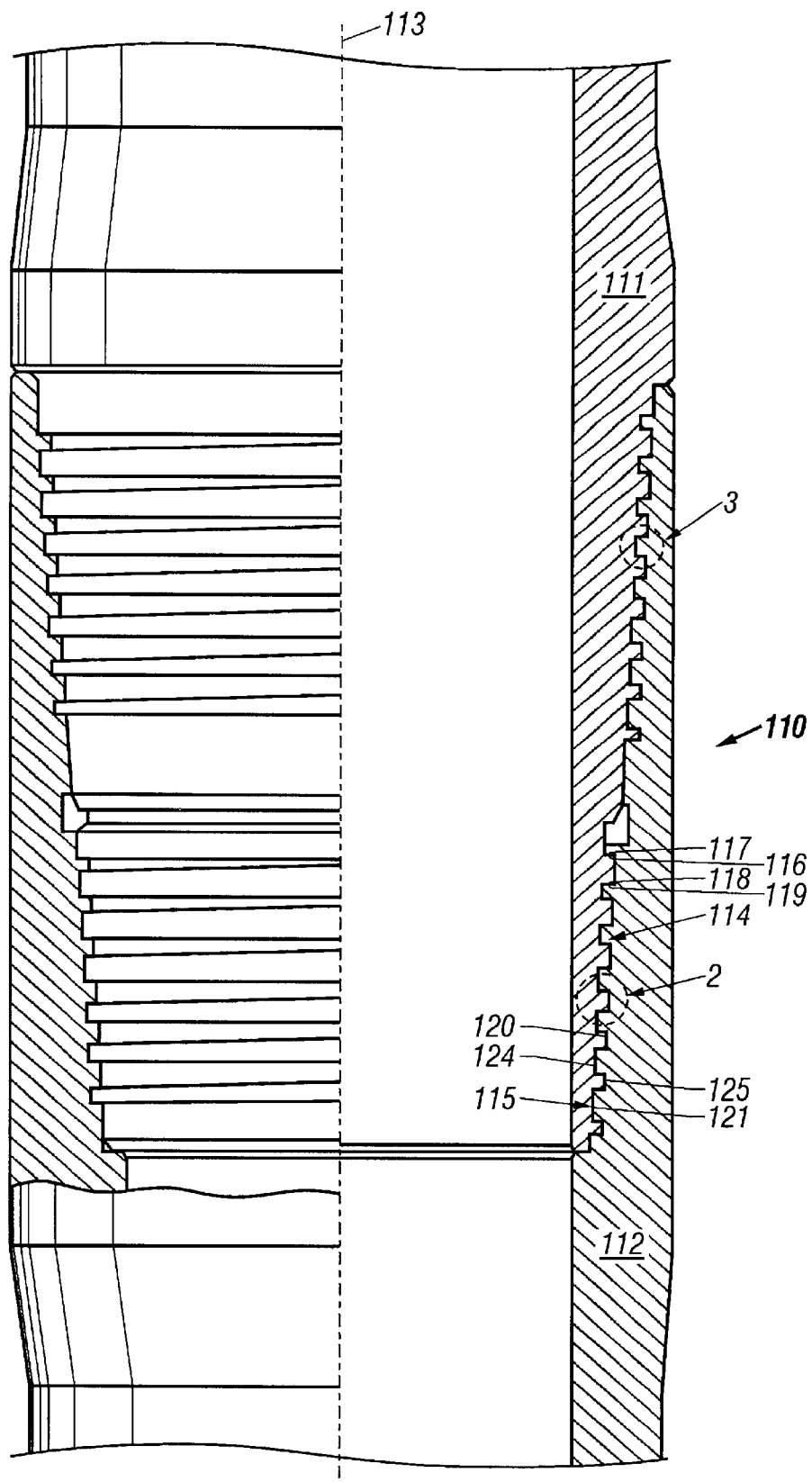
FIG. 2 is a side view of a made-up pin member external thread structure and a box member internal thread structure in accordance with an embodiment of the invention.
Figure 3:
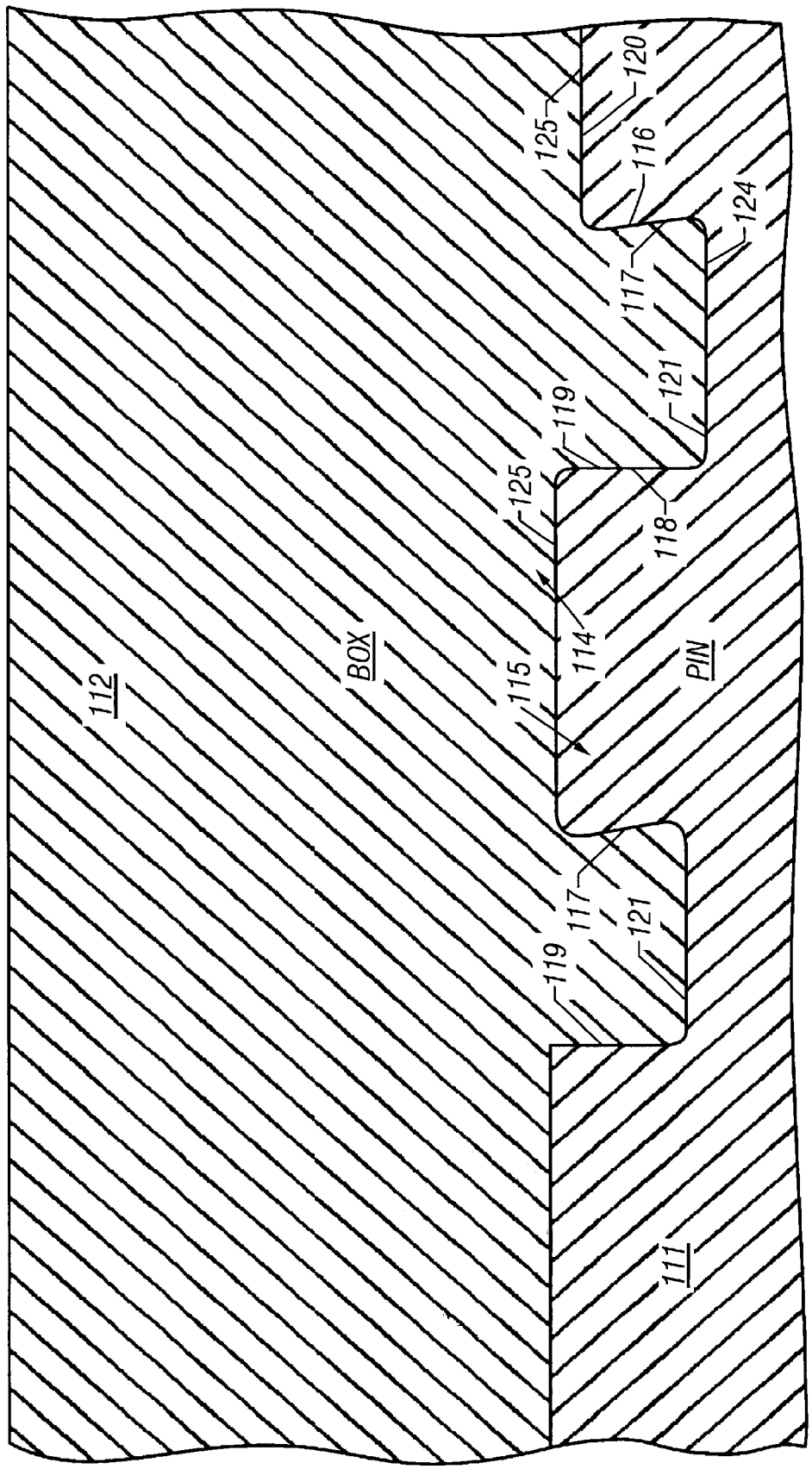
FIG. 3 in an enlarged cross-section of a tubular joint at the point of engagement between a pin member crest and a box member root in the thick section of the box member in accordance with an embodiment of the invention.
Figure 4:
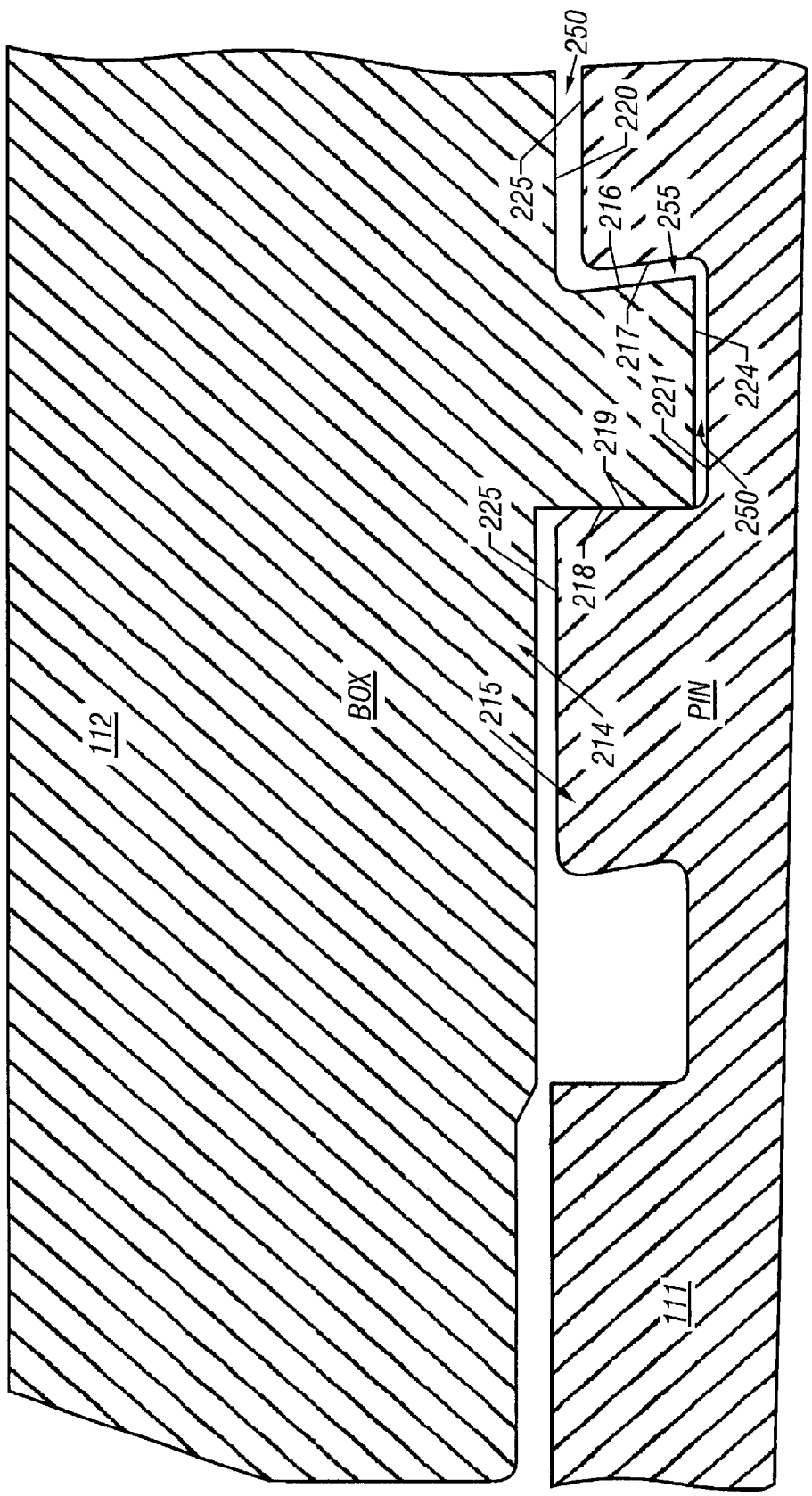
FIG. 4 is an enlarged cross section of a tubular joint at the point of engagement between a pin member crest and a box member root in the thin section of the box member in accordance with an embodiment of the invention.

Referring to the drawings wherein like reference characters are used for like parts throughout the several views, FIGS. 2, 3 and 4 illustrate a wedge-like thread connection or pipe joint, generally referenced by numeral 110, in accordance with an embodiment of the invention.

As shown in FIG. 2, internal thread 114 of box member 112 is formed in a two-step wedge configuration providing two wedge thread steps each with stab flanks 118, 218, load flanks 116, 216, roots 120, 220 and crests 124, 224. The thread increases in width progressively at a uniform rate in one direction substantially the entire helical length of thread 114. External thread 115 of pin member 111 is formed in a two-step wedge configuration providing two wedge thread steps each with stab flanks 119, 219, load flanks 117, 217, roots 121, 221, and crests 125, 225. The thread increases in width progressively at a uniform rate in the other direction substantially the entire helical length of thread 115. The oppositely increasing thread widths and the taper of the threads 114 and 115 cause the complementary flanks, roots, and crests of the respective threads to move into forcible engagement during rotational make-up of the connection and form sealing surfaces that resist the flow of fluids between the threads of one step while leaving a clearance between the threads of the other step upon rotational make-up of the connection.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed and supports the weight of the lower tubular member hanging in the well bore. The term "stab flank" designates that side wall surface of the thread that faces toward the outer end of the respective pin or box member and supports the weight of the upper tubular member during the initial make-up of the joint.

FIGS. 3 and 4 are enlarged cross-sections, which, in one or more embodiments, exist at positions 2 or 3 shown in FIG. 2. As shown in FIG. 3, roots and crests on one step of pin member 111 are dimensioned to eliminate radial clearance with complementary roots and crests on one step of box member 112 during make-up of connection 110. Also, stab flanks and load flanks on the one step of pin member 111 are dimensioned to eliminate clearance between complementary stab flanks and load flanks on the one step of box member 112 during make-up of connection 110. For example, the roots 121 and crests 125 of the smaller step of pin member 111 may be dimensioned to eliminate radial clearance with complementary roots 120 and crests 124 on the smaller step of box member 112 during make-up of connection 110. Also, stab flanks 119 and load flanks 117 of the smaller step of pin member 111 may be dimensioned to eliminate clearance between complementary stab flanks 118 and load flanks 116 of box member 112 during make-up of connection 110. In other words, thread roots 121 and thread crests 125 of pin member 111 come into interference contact with the corresponding thread surfaces of box member 112, upon making the joint hand tight and stab flanks 119 and load flanks 117 of pin member 111 come into interference contact with the corresponding thread surfaces of box member 112, upon making the joint power tight.

As shown in FIG. 4, roots and crests on the other step of pin member 111 are dimensioned to leave radial clearance between complementary roots and crests on the other step of box member 112 during make-up of connection 110. Also, the load flanks of the other step of pin member 111 are dimensioned to leave clearance between complementary load flanks on the other step of box member 112. For example, roots 221 and crests 225 on the larger step of pin member 111 are dimensioned to leave radial clearance 250 between complementary roots 220 and crests 224 on the larger step of box member 112 during make-up of connection 110. Also, load flanks 217 on the larger step of pin member 111 are dimensioned to leave clearance 255 between complementary load flanks 216 on the larger step of box member 112 during make-up of connection 110. In other words, thread roots 221 and thread crests 225 of pin member 111 remain in clearance from the corresponding thread surfaces of box member 112, upon making the joint hand tight and load flanks 217 of pin member 111 remain in clearance from corresponding load flanks 216 of box member 112 upon making the joint power tight.

Alternatively, the stab flanks 219 of pin member 111 may be dimensioned to remain in clearance from complementary stab flanks 218 of box member 112 or both the stab flanks and load flanks of pin member 111 remain in clearance from corresponding thread structures on box member 112 upon make-up of the connection. Also, though FIG. 4 shows clearance existing between both the roots and crests and the load flanks, either could remain in clearance while the other came into interference contact upon make-up of the connection. Similarly, either of the roots and crests or the stab flanks may remain in clearance while the other came into interference contact upon make-up of the connection.

The disclosed configuration has many distinct advantages. The two-step structure allows high resistance to compression and/or impact loading, while retaining sensitivity to the torque restrictions of existing field make up equipment. Further, the two-step structure reduces the amount of torque required to generate the contact stress necessary for creating a seal, while still providing the necessary threads for structural purposes. The disclosed configuration minimizes thread interference area without sacrificing sealing or structural integrity of the connector. Since connectors are able to be installed at a much lower make-up torque, this invention is particularly advantageous in applications using large diameter connectors, such as in surface casing.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A threaded pipe connection comprising:
   a box member having a two-step wedge thread configuration comprising two wedge thread steps each with a tapered, internal, generally dovetail-shaped wedge thread having stab flanks, load flanks, roots, and crests, the internal thread increasing in width in one direction;
   a pin member having a two-step wedge thread configuration comprising two thread steps each with a tapered, external, generally dovetail-shaped wedge thread having stab flanks, load flanks, roots, and crests, the external thread increasing in width in the other direction so that complementary stab flanks and load flanks of the box member thread move into engagement during rotational make-up of the connection;
   the roots and crests of at least one wedge thread step on the box member are dimensioned to contact complementary roots and crests on the pin member upon final make-up;
   on one of the at least one wedge thread step on the box member having roots and crests dimensioned to contact complementary roots and crests on the pin member, the stab and load flanks are dimensioned to contact complementary stab and load flanks on the pin member upon final make-up; and
   at least one of the stab and load flanks of the other wedge thread step on the box member are dimensioned to remain in clearance from the corresponding stab and load flanks of the other wedge thread step on the pin member upon final make-up.

2. The connection of claim 1 wherein a gap exists between the stab flanks of the other of the wedge thread steps upon final make-up.

3. The connection of claim 1 wherein the clearance exists between the stab flanks and the load flanks of the other of the wedge thread steps upon final make-up.

4. The connection of claim 1 wherein the roots and crests of both wedge thread steps come into contact during make up prior to contact of both stab and load flanks of at least one wedge thread step upon final make-up.

5. The connection of claim 1 wherein one of the wedge thread steps is an interference wedge thread step and the other is a clearance wedge thread step; and
   a greater amount of root and crest interference occurs on the interference wedge thread step than on the clearance wedge thread step upon final make-up.

6. The connection of claim 1, wherein the roots and crests of the box and pin members have sufficient width to prevent any permanent deformation of the threads upon final make-up.

7. The connection of claim 1, wherein the roots and crests of the box and pin members are flat and parallel to a longitudinal axis of the connection.

8. The connection of claim 1, wherein the contact between the roots and crests of at least one thread step on the box member and complementary roots and crests on the pin member occurs prior to the contact between the stab and load flanks of at least one thread step on the box member and complementary stab and load flanks on the pin member.

9. A method of reducing torque-induced stress in a threaded pipe connection, the method comprising:
   providing a box member having a two-step wedge thread configuration comprising two wedge thread steps each with a tapered, internal, generally dovetail-shaped wedge thread having stab flanks, load flanks, roots, and crests, the internal thread increasing in width in one direction;
   providing a pin member having a two-step wedge thread configuration comprising two wedge thread steps each with a tapered, external, generally dovetail-shaped wedge thread having stab flanks, load flanks, roots, and crests, the external thread increasing in width in the other direction so that complementary stab flanks and load flanks of the box member thread move into engagement during rotational make-up of the connection;
   dimensioning the roots and crests of at least one wedge thread step on the box member to contact complementary roots and crests on the pin member upon final make-up;
   dimensioning, on one of the at least one wedge thread step on the box member having roots and crests dimensioned to contact complementary roots and crests on the pin member, the stab and load flanks on the box member to contact complementary stab and load flanks on the pin member upon final make-up; and
   dimensioning at least one of the stab and load flanks of the other wedge thread step on the box member to remain in clearance from complementary stab and load flanks of the other wedge thread step on the pin member upon final make-up.

10. The method of claim 5, wherein
    the stab flanks of the other wedge thread step on the box member are dimensioned to remain in clearance from complementary stab flanks on the pin member upon final make-up.

11. The method of claim 5, wherein
    the stab and load flanks of the other wedge thread step of the box member are dimensioned to remain in clearance from complementary stab and load flanks on the pin member upon final make-up.

12. The method of claim 5, further comprising:
    dimensioning the roots and crests of both wedge thread steps to come into contact during make up prior to contact of both stab and load flanks of at least one wedge thread step upon final make-up.

13. The method of claim 5, wherein one of the wedge thread steps is an interference wedge thread step and the other is a clearance wedge thread step, the method further comprising:
    dimensioning the interference wedge thread step to have a greater amount of root and crest interference than the clearance wedge thread step upon final make-up.

14. The method of claim 5, further comprising:
    providing the roots and crests of the wedge thread steps of the box and pin members flat and parallel to a longitudinal axis of the connection.

15. The method of claim 5, further comprising:

providing the roots and crests of the wedge thread steps of the box and pin members with sufficient width to prevent any permanent deformation of the wedge threads upon final make-up.

16. The method of claim 5, further comprising:

dimensioning the roots and crests on at least one wedge thread step of the box member to contact complementary roots and crests on the wedge thread step of the pin member prior to contact between the stab and load flanks of at least one wedge thread step on the box member to contact complementary stab and load flanks on the wedge thread step of the pin member.

* * * * *

UNITED STATES PATENT AND TRADEMARK OFFICE
CERTIFICATE OF CORRECTION

PATENT NO.     : 6,270,127 B1
DATED          : August 7, 2001
INVENTOR(S)    : Doug Enderle It is certified that error appears in the above-identified patent and that said Letters Patent is hereby corrected as shown below:

Column 5,
Line 48, change " a gap" to -- the clearance --

Column 6,
Line 42, change "claim 5" to -- claim 9 --
Line 45, change "stab flanks" to -- stab and load flanks --
Lines 47, 52, 57 and 64, change "claim 5" to -- claim 9 --

Column 7,
Line 1, change "claim 5" to -- claim 9 --
Line 6, change "claim 5" to -- claim 9 --

Signed and Sealed this

Twenty-ninth Day of October, 2002

Attest:

JAMES E. ROGAN
*Attesting Officer*     *Director of the United States Patent and Trademark Office*